Figure 1:
Figure 2:
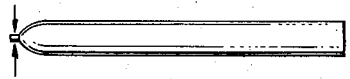
Figure 3:
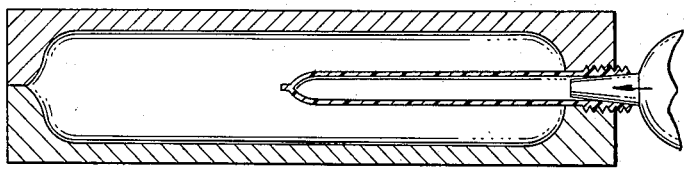
Figure 4:
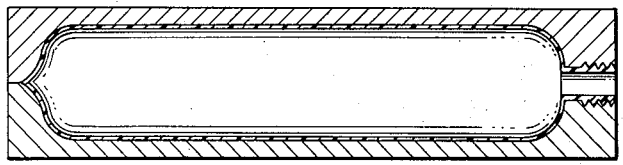

March 17, 1959

G. W. CHENEY ET AL 2,878,154

METHOD OF SEALING VINYLIDENE CHLORIDE POLYMER
SURFACES TO ONE ANOTHER

Filed Dec. 21, 1955

2 Sheets-Sheet 1

INVENTORS.
Grant W. Cheney
Arnold L. Stark

BY

Griswold & Burdick
ATTORNEYS

March 17, 1959 G. W. CHENEY ET AL 2,878,154
METHOD OF SEALING VINYLIDENE CHLORIDE POLYMER
SURFACES TO ONE ANOTHER
Filed Dec. 21, 1955 2 Sheets-Sheet 2

INVENTORS.
Grant W. Cheney
BY Arnold L. Stark

Griswold & Burdick
ATTORNEYS

United States Patent Office 2,878,154
Patented Mar. 17, 1959

2,878,154

METHOD OF SEALING VINYLIDENE CHLORIDE POLYMER SURFACES TO ONE ANOTHER

Grant W. Cheney and Arnold L. Stark, Midland, Mich., assignors to The Dow Chemical Company, Midland, Mich., a corporation of Delaware Application December 21, 1955, Serial No. 554,463

2 Claims. (Cl. 154—139)

This invention relates to a method of forming seals between opposed surfaces composed of normally crystalline vinylidene chloride polymers.

It is known that polyvinylidene chloride and many copolymers in which vinylidene chloride predominates are normally crystalline materials; that such polymeric bodies become non-crystalline when fused; that the fusion temperature for such polymers is usually above 150° C., and often near 180°–200° C.; that the fused material can be extruded or otherwise formed into tubes, sheets or other articles; that the so-formed products can be chilled rapidly to yield apparently solid products which are essentially non-crystalline and are referred to as being supercooled; that the supercooled condition is transitory but may be prolonged by maintenance of the product at a low temperature (below room temperature and preferably below 0° C. if the condition is to be of great duration); and, that upon mechanical distention a supercooled form of these polymeric bodies is converted to a crystalline form with the crystallites oriented in the direction or directions of the applied distending force. Sheets, films and other oriented crystalline articles made from such normally crystalline polymers are tough and impervious to the transpiration of most gases and to the passage of liquids, and are useful in packaging foods and numerous other articles.

The methods principally used for sealing or welding together two surfaces of such polymeric vinylidene chloride articles involve the application of heat and pressure, or of radiofrequency oscillations and pressure in the area to be sealed. Packaging procedures which involve such sealing operations require special heating equipment adapted to handle the particular packages being made. Most such equipment is designed for operation with oriented crystalline films of the vinylidene chloride polymers.

In some packaging procedures using normally crystalline vinylidene chloride polymers, the package is formed from tubes or sheets of the supercooled polymer. Thus, a supercooled tube may be filled with the intended merchandise under sufficient fluid pressure to distend the tube, converting most of it to an oriented, crystalline form. Or, a pair of supercooled sheets may be deformed around some merchandise, orienting and crystallizing the main body of the sheets. In another procedure, a supercooled sheet is converted to a cup-like receptacle, as by molding or by vacuum drawing of its central portion, and, after filling with merchandise, the so-formed container is closed by a planiform or dished cover of the same polymeric material. In all such cases, an end or an edge or rim of the final package remains essentially unstretched during the distention of the main body of the polymeric article, and the relatively unstretched portion or portions are not crystallized due to orientation stresses. This is desirable to the extent that it provides a point or line at which the package can be opened readily, as by tearing the unoriented margin of the polymeric package, but is undesirable unless the package can be sealed hermetically. Heat sealing is unsatisfactory in such cases, as it induces too rapid and too complete crystallization of the polymer from the supercooled state, and, while it effects hermetic sealing, it makes difficult opening the package along the line of the seal.

It is the principal object of this invention to provide a method for making sealed packages from normally crystalline vinylidene chloride polymers in which part of the area of the package may be oriented but at least that part of the packaging material in the intended seal area is predominantly uncrystallized and supercooled at the time the seal is made.

Figure 5:
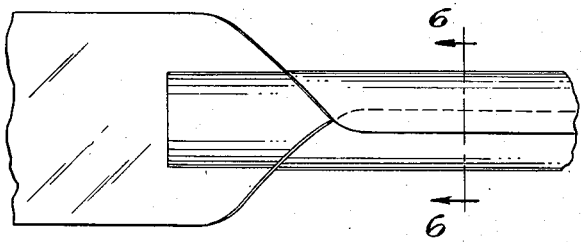
Figure 6:
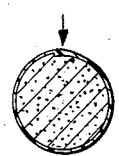
Figure 7:
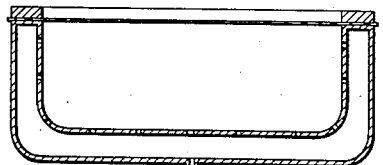
Figure 8:
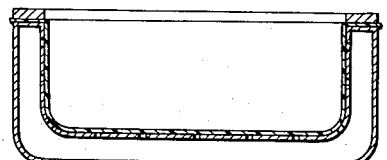
Figure 9:
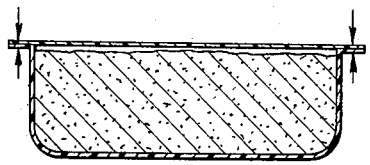
Figure 10:
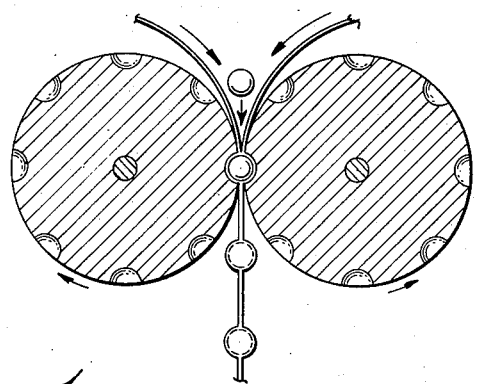

Various modes of applying the principle of the invention are illustrated schematically in the annexed drawing, wherein Figs. 1–4 show the making of collapsible tubes; Figs. 5–6 show a tubular package made from sheet; Figs. 7–9 show a deep drawn package made from sheets; and Fig. 10 shows the use of two sheets in an encapsulating process.

According to the invention, opposed surfaces composed of supercooled but normally crystalline vinylidene chloride polymer are brought into pressure contact with one another at a temperature in the range from 20° to 45° C. The pressure required is only that needed to insure face-to-face contact. It may be less than 2 and need not exceed 20 pounds per square inch, though greater pressures have no adverse effect on the seal. In the said temperature range, opposed surfaces of the supercooled polymer will merge with one another and become fused together under a very slight applied pressure. At the lower end of the operative temperature range, the pressure contact must be maintained longer than when the temperature is in the intermediate and preferred range of from 30° to 35° C. This is partly because the rate of plastic flow of the supercooled polymer becomes very slight at low temperatures, and is so slight at temperatures below 20° C. as to make successful sealing at such temperatures too slow for practical packaging operations, and partly because the polymer tends to become tacky only in the recited range. At temperatures near the upper end of the useful range, i. e., near 45° C., sealing must be effected promptly because such temperatures shorten the amorphous life of the polymer and induce recrystallization. Once the polymer has become significantly crystalline, low pressure sealing is impossible and high temperature methods are required in which the polymer is melted to make the seal.

The simple, low pressure, moderate temperature sealing method of the invention is useful in a variety of packaging or package-making operations. In one, the polymer is extruded as a tube, which is supercooled by immersion in a bath of cold water. The tube is cut (Fig. 1) to about one-third the length of an intended collapsible tube to be made therefrom. While supercooled, the tube is brought to a temperature in the range from 20° to 45° C., and one end is pinched shut (Fig. 2) thereby becoming sealed by fusion of the opposed surface areas to one another. The open end of the supercooled tube is then clamped in a mold (Fig. 3) the cavity of which is 3 to 5 times as great in length and diameter as that of the supercooled tube, and the tube is expanded by internal fluid pressure applied through the open end, to fit the mold, thereby forming a thin-walled collapsible tube (Fig. 4) for creams, ointments, or pastes. The fluid pressure may be that of air or water or steam or, if desired, the fluid merchandise to be dispensed from the tube.

In another type of operation, a sheet of the supercooled polymer, of a width slightly greater than the circumference of a cylindrical sausage, is fed to a sausage stuffing machine, rolled about its longitudinal axis, to form a tube (Fig. 5), and stuffed with the sausage ingredients while confined under a moderate pressure, and at a temperature from 20° to 45° C., until the lapped edges of the sheet have fused together, forming a cylindrical casing for the meat, shown in cross-section in Fig. 6.

Yet another operation in which the present invention is useful comprises deep drawing or vacuum forming (Figs. 7 and 8) a cup-like receptacle from a flat supercooled sheet of the polymer, leaving a marginal rim of unoriented and still supercooled polymer, filling the receptacle, overlaying it with a cover sheet at least the marginal rim of which is of essentially the same polymer in supercooled form, and finally sealing the two members together about the marginal rim (Fig. 9), by applying moderate pressure thereto at a temperature from 20° to 45° C.

Pills or seeds or like small objects may be encapsulated between sheets of supercooled polymer, as by means of the well-known mated indented capsulating wheels, and applying pressure around each enclosed object while the supercooled strips are at a temperature from 20° to 45° C., so as to fuse the opposed surfaces together, as illustrated in Fig. 10.

These and numerous variations of the described procedures result in a package hermetically sealed against the transpiration of gases and liquids, employing low temperature and low pressure sealing means to effect fusion of opposed surfaces of the supercooled polymer.

If desired in a particular package, a tear strip of plastic tape, cellophane or string may be sealed into the joint, to facilitate opening the package along a predetermined line.

The principle of the present invention was disclosed, but not claimed, in our copending application Serial No. 313,908, filed October 9, 1952, relative to collapsible tubes. That application has now become U. S. Patent No. 2,769,206.

We claim:

1. The method which comprises bringing opposed surfaces of a normally crystalline vinylidene chloride polymer in the supercooled, noncrystalline condition into contact with one another at a temperature in the range from 20° to 45° C. and under sufficient pressure to fuse the said surfaces together in the area of contact.

2. The method claimed in claim 1, wherein the operating temperature is near 30° to 35° C.

References Cited in the file of this patent
UNITED STATES PATENTS

| | | |
|---|---|---|
| 1,607,626 | Hopkinson | Nov. 23, 1926 |
| 2,536,773 | Saidel | Jan. 2, 1951 |
| 2,568,094 | Smith | Sept. 18, 1951 |
| 2,679,968 | Richter | June 1, 1954 |
| 2,679,969 | Richter | June 1, 1954 |

Notice of Adverse Decision in Interference

In Interference No. 92,406 involving Patent No. 2,878,154, G. W. Cheney and A. L. Stark, Method of sealing vinylidene chloride polymer surfaces to one another, final judgment adverse to the patentees was rendered Mar. 30, 1964, as to claims 1 and 2.

[*Official Gazette August 25, 1964.*]